United States Patent [19]
Jaynes et al.

[11] Patent Number: 5,409,670
[45] Date of Patent: Apr. 25, 1995

[54] SCR REACTOR SEALING MECHANISM

[75] Inventors: Leslie P. Jaynes, Richardson; Kenneth D. Thomas, Dallas, both of Tex.

[73] Assignee: Peerless Manufacturing Company, Dallas, Tex.

[21] Appl. No.: 105,424

[22] Filed: Aug. 13, 1993

[51] Int. Cl.⁶ .................. B01D 50/00; B01J 8/02; B01J 19/30
[52] U.S. Cl. .................. 422/177; 422/179; 422/212; 422/221; 422/237; 422/238; 422/311
[58] Field of Search ........... 422/177, 179, 178, 180, 422/181, 190–191, 211, 212, 214, 221, 222, 237, 238, 239, 310, 311, 312; 502/439

[56] References Cited

U.S. PATENT DOCUMENTS

| | | | |
|---|---|---|---|
| 3,441,382 | 4/1969 | Keith et al. | 422/180 |
| 3,589,535 | 6/1971 | Reading | 444/592 |
| 3,732,080 | 5/1973 | Klepitko | 422/179 |
| 3,892,536 | 7/1975 | Roeser et al. | 422/169 |
| 4,238,455 | 12/1980 | Ogiwara | 422/171 |
| 4,324,701 | 4/1982 | Honda et al. | 252/477 R |
| 4,428,300 | 1/1984 | Ziegenfus et al. | 104/250 |
| 4,544,525 | 10/1985 | Honda et al. | 422/171 |
| 4,843,815 | 7/1989 | Smojver | 60/299 |
| 4,849,185 | 7/1989 | Wittig | 422/171 |
| 5,008,086 | 4/1991 | Merry | 422/180 |
| 5,211,012 | 5/1993 | Swars | 60/295 |

*Primary Examiner*—Robert J. Warden
*Assistant Examiner*—Christopher Y. Kim
*Attorney, Agent, or Firm*—Richards, Medlock & Andrews

[57] ABSTRACT

An SCR reactor sealing mechanism is disclosed which utilizes a clamping plate (34) to urge a side sealing flange (24) on a member (20) containing the catalyst (22) against a mating sealing surface (32) on the supporting internal frame (12) to prevent exhaust gas from bypassing the catalyst. The sealing mechanism has an advantage in permitting the member and catalyst to be removed from the internal frame by simply loosening the clamping plate (34) and slid out of or into the internal frame.

11 Claims, 6 Drawing Sheets

SCR REACTOR SEALING MECHANISM

TECHNICAL FIELD OF THE INVENTION

This invention relates to an improved seal to seal a catalyst insert to the frame of a SCR reactor.

BACKGROUND OF THE INVENTION

SCR reactor technology is being used with increasing frequency to treat the exhaust gases from an industrial process, such as energy production, before the gas is released to the atmosphere. The SCR reactor process relies on the use of proprietary catalysts to treat the exhaust gas as the gas passes through the SCR reactor. Because the catalyst is an integral part of the chemical reaction, great effort is used to provide maximum exposure of the catalyst to the exhaust gas and to ensure that all the exhaust gas comes in contact with sufficient catalysts for treatment.

The catalysts will have a limited effective service life. The catalysts must be removed and replaced with new catalysts at regular intervals. Therefore, great attention must be paid to the design so that this exchange of catalysts can be undertaken quickly with a minimum of effort. A need exists for further advancement in this regard, while maintaining the fundamental requirement that all exhaust gas pass through the catalyst.

SUMMARY OF THE INVENTION

In accordance with one aspect of the present invention, an apparatus is provided for treating an exhaust gas with a catalyst. The apparatus includes a member containing a catalyst and having at least one sealing flange. A frame is provided with the exhaust gas passing through the frame. The catalyst member is received in the frame in the path of the exhaust gas and the frame has a sealing surface thereon. A clamping plate is attached to the frame and clamps the sealing flange into sealing contact with the sealing surface, preventing leakage of the exhaust gas passed the catalyst member.

In accordance with another aspect of the present invention, the clamping plate maintains the sealing contact between the sealing surface on the frame and the sealing flange on the catalyst member as the catalyst member thermally expands and contracts.

In accordance with another aspect of the present invention, the frame has a bottom, two sides and a top. The catalyst member similarly has a bottom, two sides and a top. Each side of the frame has a sealing surface and each side of the catalyst member has a sealing flange. A clamping plate is mounted to each side of the frame to clamp the sealing flange into sealing contact with the sealing surface. The apparatus permits ready removal of the catalyst member by simply loosening the clamping plates on the sides of the frame and lifting the catalyst member out of the frame.

BRIEF DESCRIPTION OF THE DRAWINGS

For a more complete understanding of the present invention and for further advantages thereof, reference is now made to the following description to the preferred embodiment, taken in conjunction with the accompanying drawings, in which.

DETAILED DESCRIPTION

Figure 1:
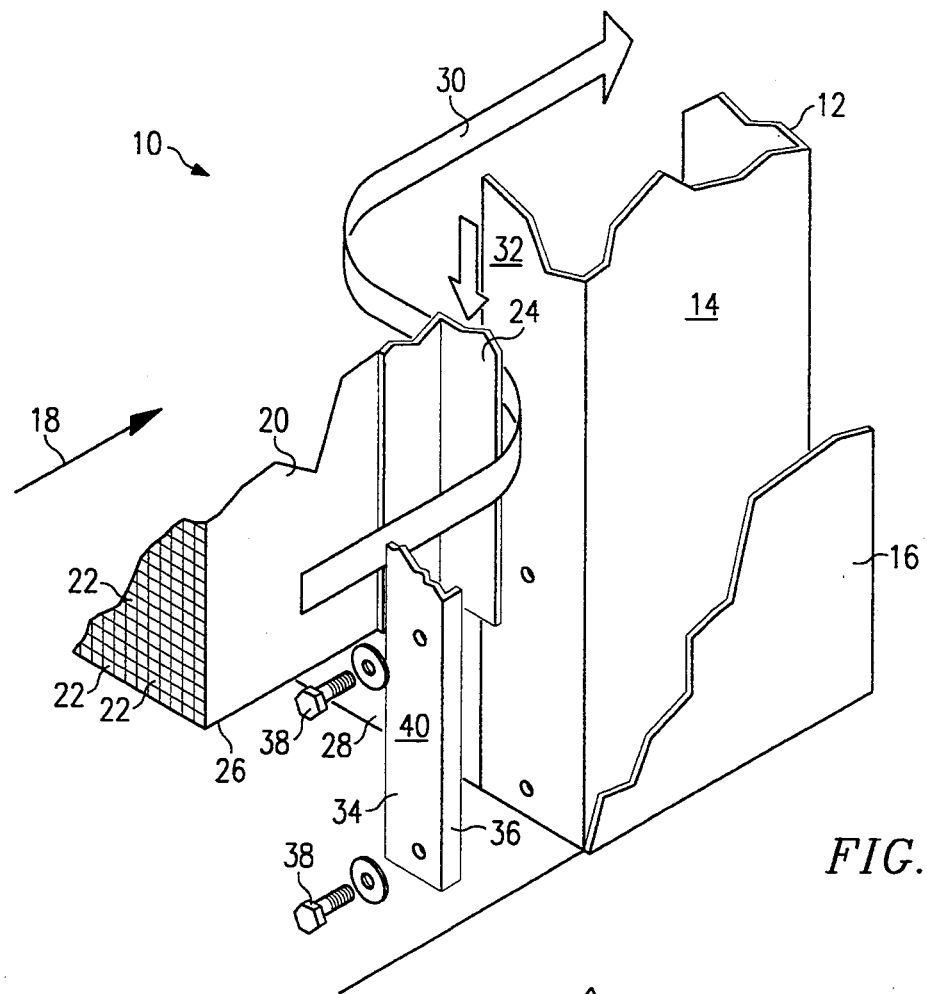
FIG. 1 is a perspective view of an SCR reactor with a sealing assembly forming a first embodiment of the present invention.
Figure 2:
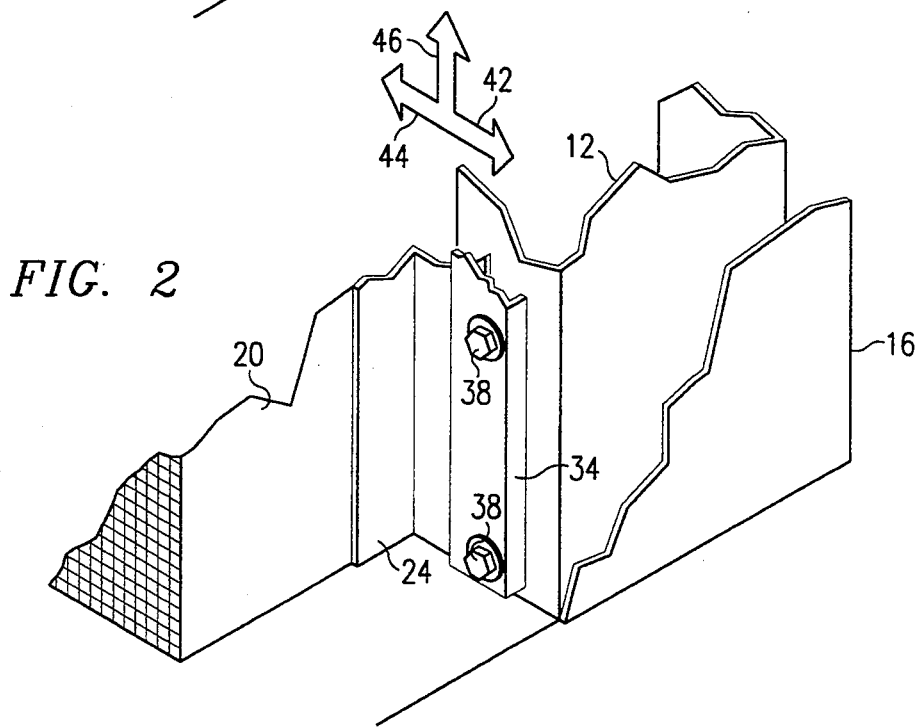
FIG. 2 is a perspective view of the sealing assembly of FIG. 1 made up.

With reference now to the FIGURES, wherein like reference numerals refer to like or corresponding parts throughout the several views, and particularly to FIGS. 1 and 2. FIGS. 1 and 2 illustrate an SCR reactor 10 which forms a first embodiment of the present invention. The SCR reactor 10 includes an internal frame 12 which includes a bottom and two sides, only side 14 of which is illustrated. Exterior the frame 12 is a reactor wall 16.

The exhaust gas from an industrial process, such as the burning of natural gas for energy production, passes through the frame in the direction of arrow 18. A member 20 containing catalyst 22 is mounted within the internal frame 12 and is positioned across the exhaust gas flow path. The exhaust gas will flow through the catalyst, causing various chemical reactions to occur between the exhaust gas and catalyst which results in the exhaust gas being depleted of harmful components prior to release into the atmosphere.

An important feature of the reactor 10 is the seal mechanism which assures that the exhaust gas flow will be forced through the catalyst while permitting the member 20 and catalysts therein to be removed easily for replacement.

The member 20 has a pair of side sealing flanges and a top sealing flange, only side sealing flange 24 of which is illustrated. The bottom 26 of member 20 is effectively sealed to the bottom 28 of the internal frame by the weight of the member 20 and catalyst 22 therein.

The member 20 is designed to be removed from the frame by lifting it vertically in the direction of arrow 46.

The sealing mechanism includes the sealing flange 24 and a mating sealing surface 32 on the internal frame 12. The sealing mechanism also includes a clamping plate 34 which has an L-shape with wide portion 40 and leg 36. Bolts 38 secure the clamping plate 34 to the internal frame 12 in a manner with portion 40 of the clamping plate 34 overlying the sealing flange 24 so that the sealing flange 24 is trapped between the clamping plate 34 and the sealing surface 32. As the bolts are tightened, the clamping plate 34 forces the sealing flange 24 into sealing engagement against the sealing surface 32 of the internal frame 12. Thus, a potential route of exhaust gas leakage passed the catalyst around the member 20, illustrated by arrow 30, is prevented.

A significant advantage of the sealing mechanism described is the fact that the sealing mechanism will accommodate thermal expansion and contraction of the catalyst 22 and member 20. The catalytic action will generate heat which will raise the temperature of the catalyst and member 20° Typically, with a positive coefficient of thermal expansion, the frame and sealing flange 24 will expand when heated in the direction of arrow 42. As the catalyst and member cool, the member 20 and sealing flange 24 will contract in the direction of arrow 44. Irregardless of this expansion and contraction, the clamping plate 34 will hold the sealing flange 24 in a sliding sealed engagement with the sealing surface 32.

Another significant advantage exists when the catalyst is to be replaced. The member 20 and catalyst can be removed readily by removing only the clamping plate 34 at the top of the reactor and simply loosening the bolts 38 on the side clamping plates sufficiently to reduce or eliminate the engagement force between the clamping plate 34 and the sealing flange 24, permitting the member 20 and catalyst 22 to lifted out of the internal frame without difficulty.

The present invention has significant advantages over other possible designs. If the member containing the catalyst was bolted directly to the internal frame 12 by use of a bent plate or a structural member, this attachment would not allow for movement due to expansion and contraction. Further, to remove the member and catalyst, each of the attachment bolts would have to be completely removed, creating a significant time delay and a galling problem. Further, each time a new member was inserted in the internal frame, the bolt holes would have to be aligned, creating additional delays and efforts.

An alternative design, loading the member into a frame and using a leaf spring or a jack bolt to seal against the sealing surface of the internal frame also has disadvantages. This design would require too much tight tolerancing to make a good seal. It would also increase the time consumed in loading new catalysts and would require expensive sealing components.

In contrast, the sealing mechanism of the present invention has a number of advantages. It is easier to load the catalyst and member 20 than any other type of known sealing mechanism because no accurate alignment is needed. The sealing mechanism results in fewer leaks and works irregardless of the size of the reactor. When the reactor has multiple catalyst-filled members in series, the individual members can be removed and replaced as needed. The design is compact and easy to fabricate and no installation items are necessary requiring storage.

Figure 3:
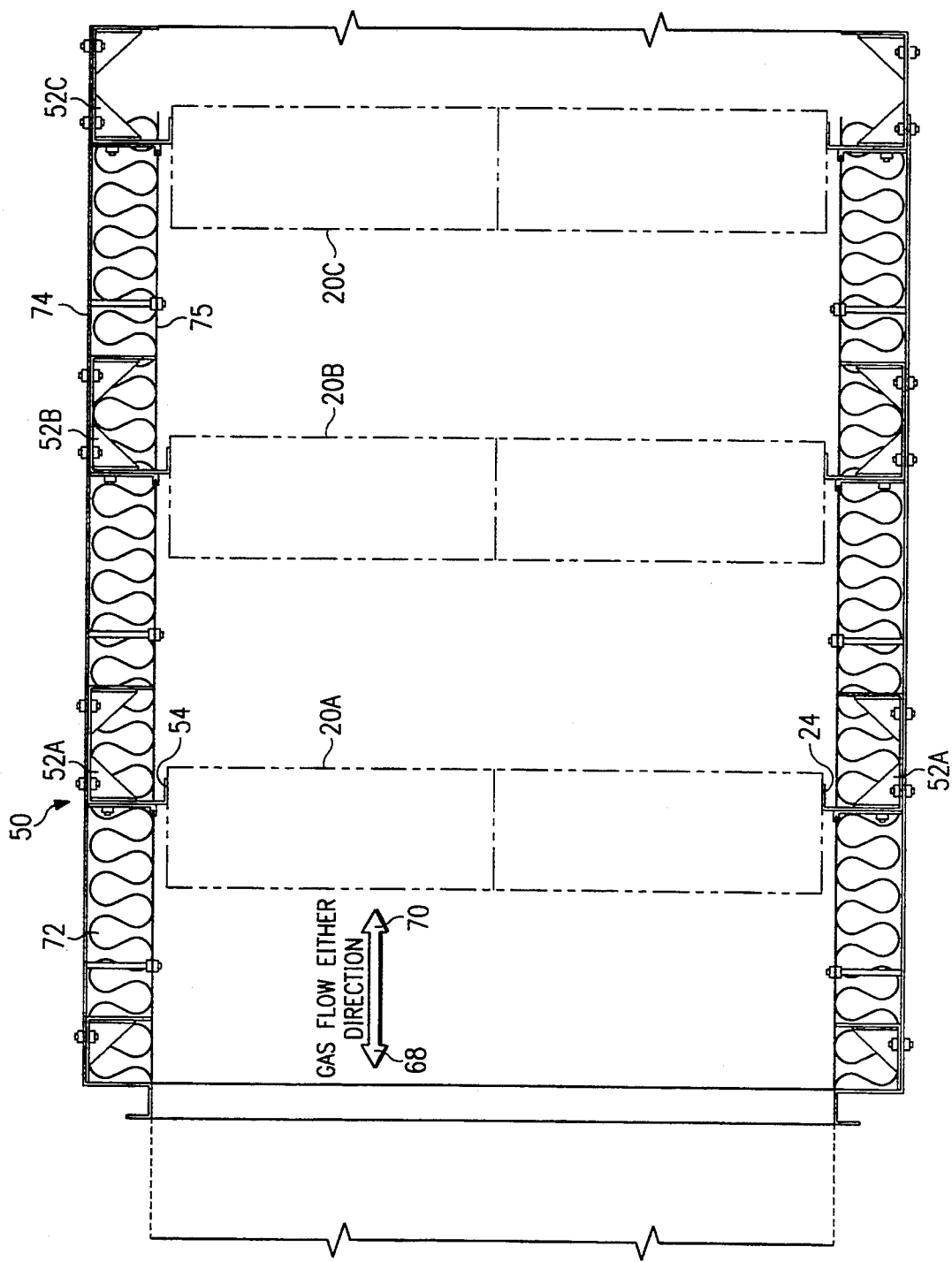
FIG. 3 is a plan view of an SCR reactor incorporating an embodiment of the present invention with internal insulation.
Figure 4:
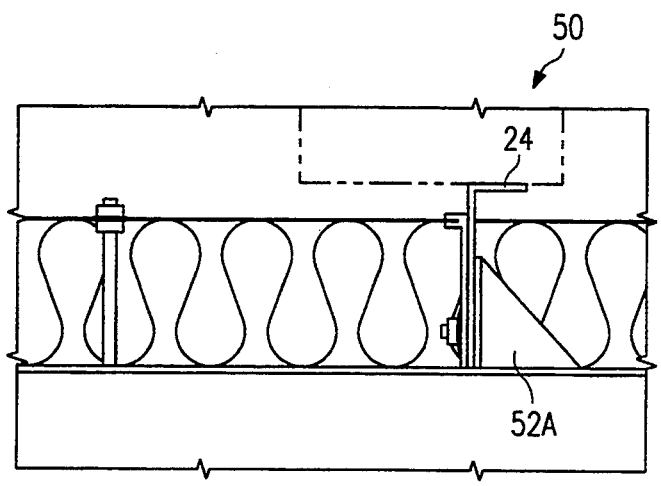
FIG. 4 is a detail view of a portion of FIG. 3.
Figure 5:
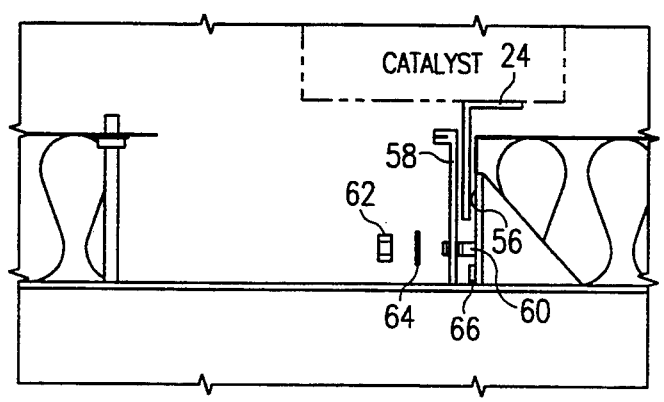
FIG. 5 is a detail view of a portion of FIG. 3.
Figure 6:
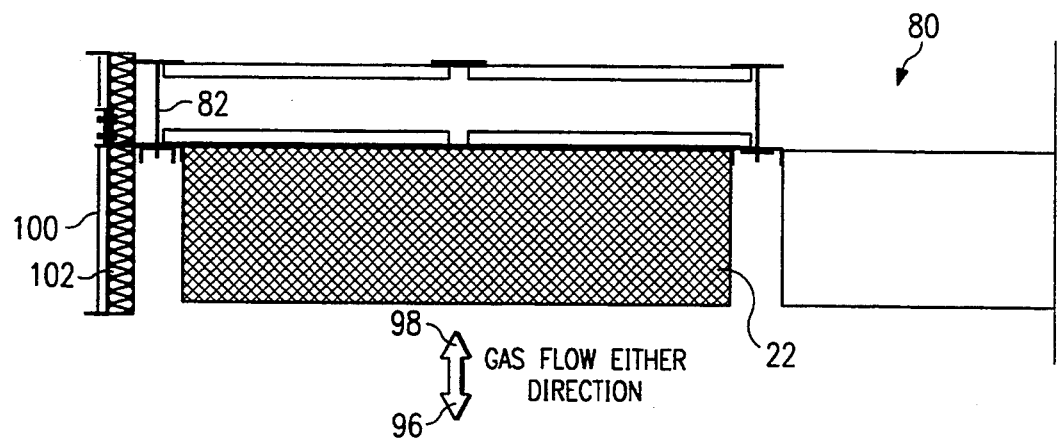
FIG. 6 is a plan view of a modified SCR reactor forming an embodiment of the present invention.
Figure 7:
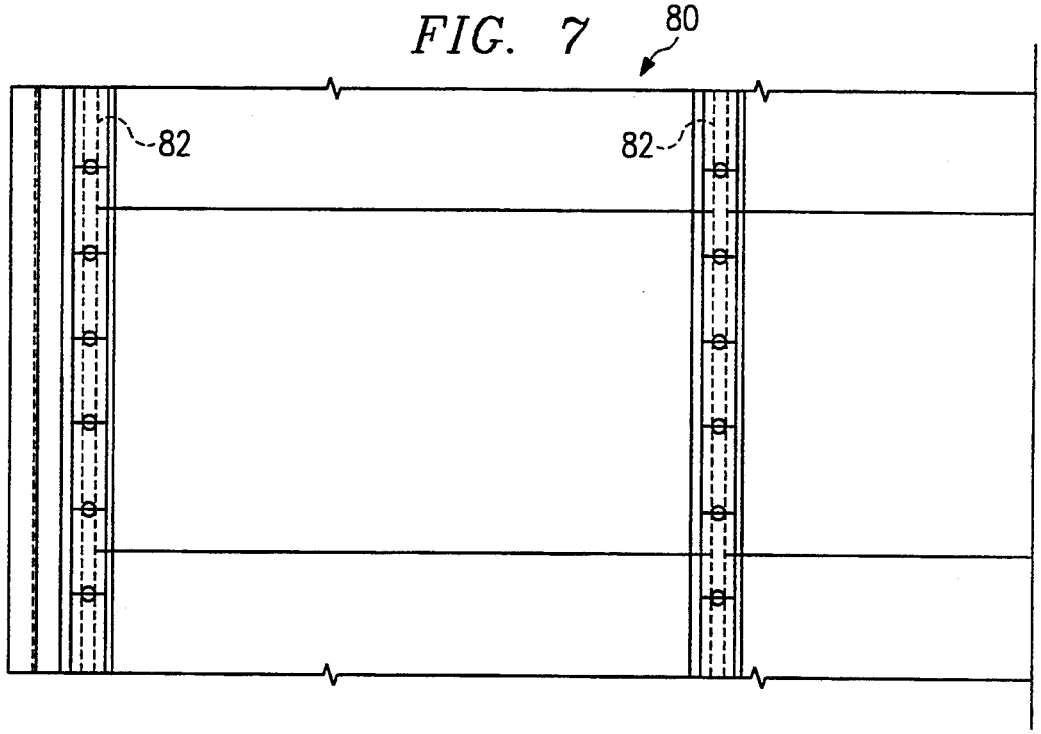
FIG. 7 is a front view of the SCR reactor of FIG. 6.
Figure 8:
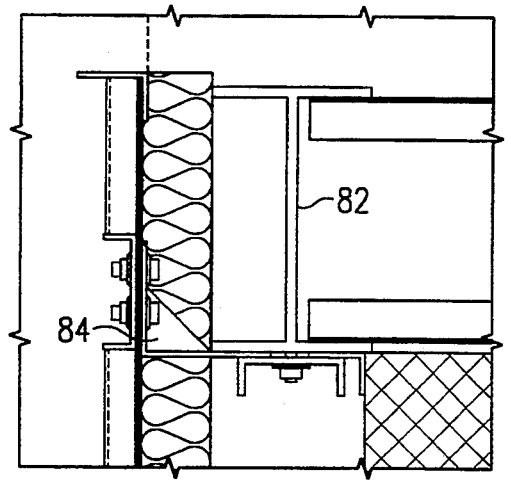
FIG. 8 is a detail view of the SCR reactor of FIG. 6.
Figure 9:
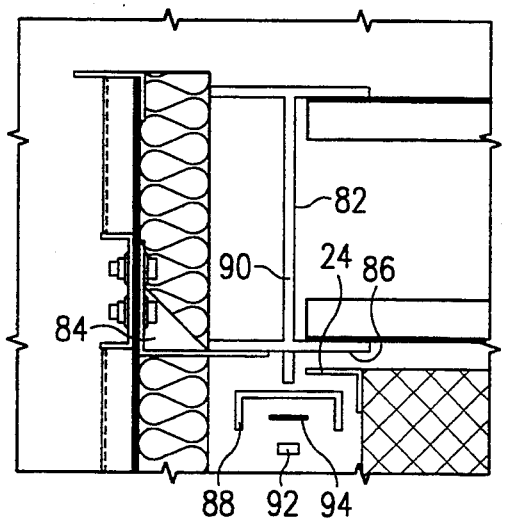
FIG. 9 is an exploded detail view of the SCR reactor of FIG. 6.

FIGS. 3–5 illustrate a modified SCR reactor 50 forming another embodiment of the present invention. The reactor 50 can be seen to have a internal frames 52A, 52B and 52C which supports three members 20A, 20B and 20C, each member having sealing flanges 24 on one side of the member and sealing flanges 54 on the opposite side of the member. Each of the sealing flanges is clamped into sealing engagement with a sealing surface 56 of internal frames 52A, 52B and 52C by clamping plates 58. A bolt 60 is mounted on each of the internal frames and extends outwardly to receive the clamping plate 58. A nut 62 and washer 64 clamp the clamping plates against the sealing flanges. A filler plate 66 is mounted on each internal frame with the filler plate having a thickness corresponding to the thickness of the sealing flange to reduce deflection of the clamping plate 58 as the nut 62 is tightened. As can be readily understood, the exhaust gas, passing through the reactor 50 in either the direction of arrow 68 or arrow 70 will be prevented from bypassing the catalysts in each of the members 20 due to the effective seal created between clamping plates 58, sealing flanges 24 and 54, and sealing surfaces 56.

The reactor 50 also illustrates the presence of insulation 72 between each of the internal frames and between the exterior reactor wall 74 and interior reactor wall 75.

FIGS. 6–9 illustrate a modified SCR reactor 80 forming another embodiment of the present invention. In reactor 80, an internal support 82 is mounted permanently to the internal frame 84. The internal support defines a sealing surface 86 against which the sealing flange 24 is urged by a U-shaped clamping plate 88. The internal support 82 defines a plurality of bolts 90 for clamping the clamping plate 88 against the sealing flange 24 by nuts 92 and washers 94.

The exhaust gas flow can be in the direction of either arrow 96 or 98 and the effective seal between the clamping plate 88, sealing surface 86 and sealing flange 24 will prevent the gas from bypassing the catalyst 22 within the member 20. The reactor further defines a reactor wall 100 and insulation 102 between the reactor wall and the interior of the internal frames.

Figure 10:
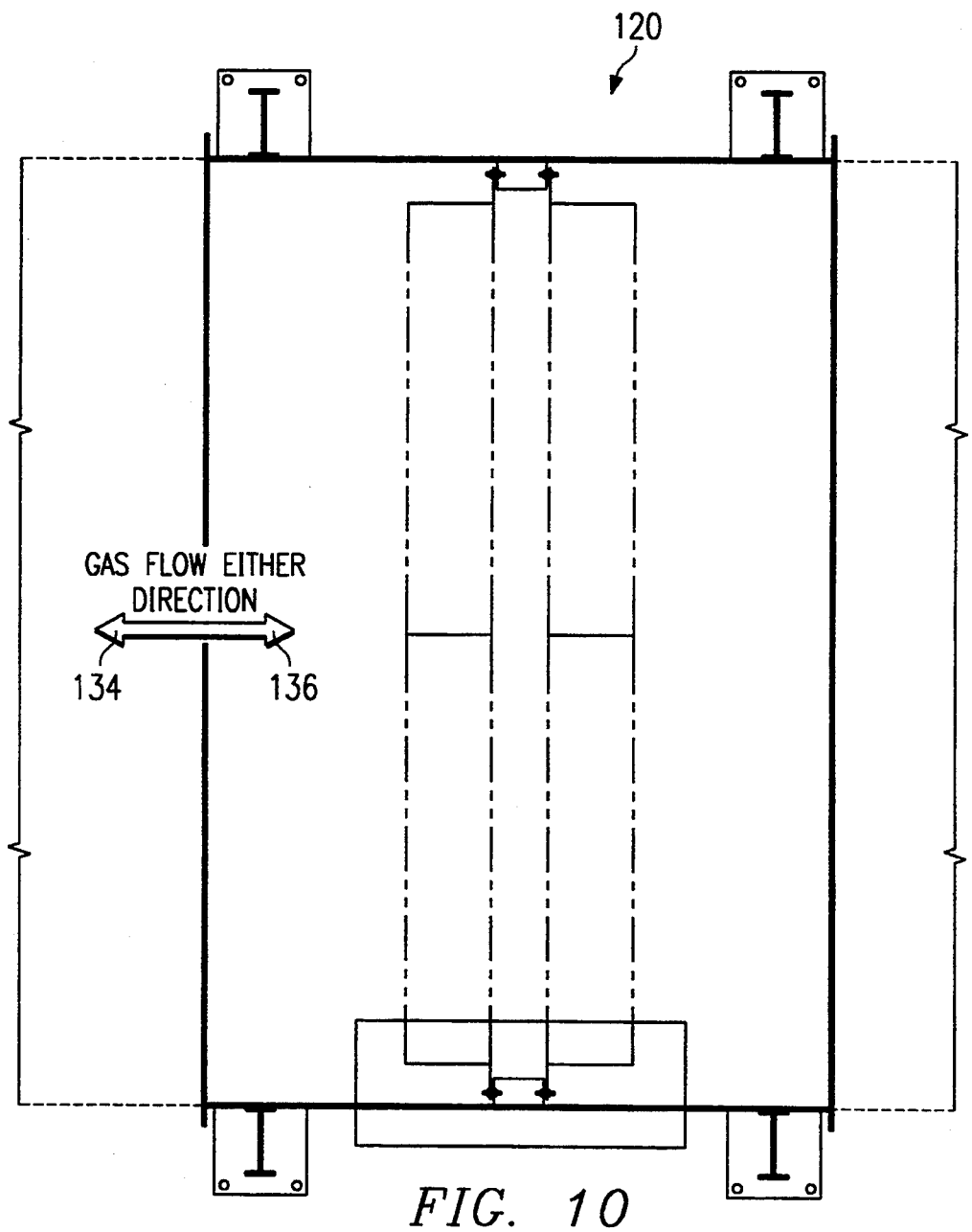
FIG. 10 is a plan view of another modified SCR reactor forming an embodiment of the present invention with external insulation.
Figure 11:
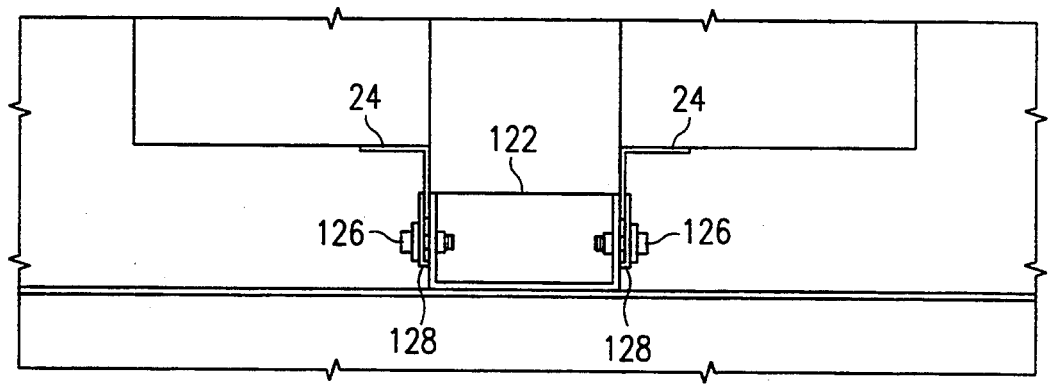
FIG. 11 is a detail view of the SCR reactor of FIG. 10.
Figure 12:
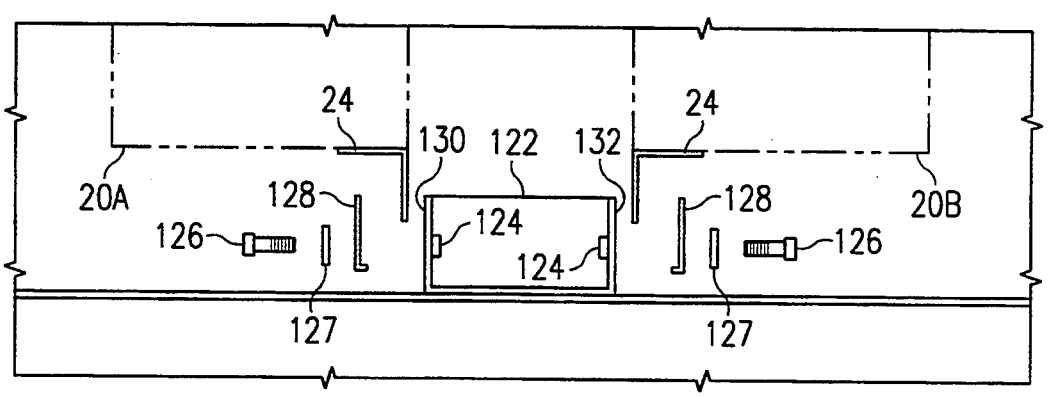
FIG. 12 is an exploded detail view of the SCR reactor in FIG. 10.

With reference now to FIGS. 10–12, another modified SCR reactor 120 is illustrated which forms another embodiment of the present invention. In reactor 120, two member 20a and 20b are mounted therein back to back. A single internal frame 122 on each side of the reactor mounts members 20a and 20b. A captured nut 124 is welded or otherwise attached to the sides of the internal frame 122 to receive bolts 126 and washers 127 to clamp clamping plates 128 against the sealing flanges 24 and 54 of the members 20A and 20B against the sealing surfaces 130 and 132.

Again, the exhaust gas can be in a direction of either arrow 134 or 136 and the sealing between the clamping plates 128, sealing flanges 24 and 54, and sealing surfaces 130 and 132 prevents bypass of the exhaust gas around the catalyst.

Although the present invention has been described with respect to a specific preferred embodiment thereof, various changes and modifications may be suggested to one skilled in the art, and it is intended that the present invention encompass such changes and modifications as fall within the scope of the appended claims.

We claim:

1. A method for installing and removing a member containing a catalyst within a frame, comprising the steps of:

inserting the member containing the catalyst through a top of the frame so that said sealing flanges on the member slide downwardly between sealing surfaces on the frame and clamping plates attached to the frame adjacent each sealing surface, the sealing surfaces being planar thereby forming a seal between the bottom of the member containing the catalyst with the bottom of the frame from the weight of the member and catalyst; and clamping the clamping plates to clamp the sealing flange into sealing contact with the sealing surface preventing leakage of the exhaust gas past the catalyst, while permitting the sealing flange and sealing surface to slide relative each other as the frame thermally expands and contracts.

2. The apparatus of claim 1 further comprising the step of overlapping of the clamping plate, sealing flange and sealing surface to maintain the seal contact as the frame thermally expands and contracts.

3. A method of claim 1, and further member containing a catalyst from the frame in an SCR reactor, by:
   loosening, but not removing, clamping plates clamping sealing flanges on the member in sealing contact with sealing surfaces on the frame to release the sealing flanges; and
   lifting the member out of the frame.

4. The method of claim 3 wherein the step of loosening the clamping plates does not require the clamping plates to be removed from the frame.

5. A method for installing and removing a member containing a catalyst within a frame, the member having a bottom and first and second side sealing flanges, the side sealing flanges being planar, the frame having first and second planar sealing surfaces, comprising the steps of:
   inserting the member through a top of the frame so that the first and second side sealing flanges on the member slide downwardly along the first and second sealing surfaces on the frame thereby forming a seal between the bottom of the member containing the catalyst with the bottom of the frame from the weight of the member and catalyst, respectively;
   clamping the first side sealing flange against the first sealing surface of the frame with a clamping plate attached to the frame with sufficient force to form a seal preventing leakage of exhaust gas but permitting the first side sealing flange and first sealing surface to move relative each other as the member thermally expands and contracts;
   clamping the second side sealing flange against the second sealing surface on the frame with a clamping plate with sufficient force to form a seal preventing leakage of the exhaust gas but permitting the second side sealing flange and second sealing surface to move relative each other as the member thermally expands and contracts.

6. The method of claim 5 wherein the clamping plates have an L shape formed with a wide portion and a leg, a plurality of bolts passing through the wide portion of the clamping plates and the frame, the steps of clamping the clamping plates including the steps of tightening the bolts to force an edge of the wide portion of the clamps against the side sealing flanges.

7. The method of claim 5 further comprising the steps of removing the member by releasing and not removing the clamping plates from the frame and withdrawing the member through the top of the frame.

8. The method of claim 5 further comprising the steps of permanently installing threaded studs in the frame adjacent each sealing surface and forming apertures in the clamping plates to fit over the studs, the clamping including the step of tightening nuts on the threaded studs to clamp the clamping plates to clamp the sealing flanges into sealing contact with the sealing surfaces.

9. The method of claim 5 wherein the clamping plates are U shaped in cross-section and have a wide portion and two legs, the step of clamping including clamping the wide portion against the side sealing flanges.

10. The method of claim 5 further for installing a second member within the frame, the frame having third and fourth sealing surfaces formed thereon, the second member having a third side sealing flange and a fourth side sealing flange, including the steps of inserting the second member through the top of the frame so that the third and fourth side sealing flanges on the second member slide downwardly between the third and fourth sealing surfaces on the frame, respectively, and clamping plates attached to the frame adjacent said third and fourth sealing surfaces;
   clamping the clamping plates to clamp the third and fourth sealing flanges into sealing contact with the third and fourth sealing surfaces preventing leakage of the exhaust gas while permitting the third and fourth side sealing flanges to move relative the third and fourth sealing surfaces as the member thermally expands and contracts.

11. The method of claim 5 wherein the side sealing flanges have a thickness and further comprising the step of installing a filler plate on the frame adjacent each sealing surface, the filler plates having a thickness approximately equal to the thickness of the sealing flanges, the step of clamping including the step of clamping the clamping plates against the side sealing flanges and the filler plates. comprising removing the

* * * * *

UNITED STATES PATENT AND TRADEMARK OFFICE
CERTIFICATE OF CORRECTION

PATENT NO. : 5,409,670
DATED : April 25, 1995
INVENTOR(S) : Jaynes et al.

It is certified that error appears in the above-indentified patent and that said Letters Patent is hereby corrected as shown below:

Col. 3, l. 6, delete "°" and insert --.--.

Col. 4, l. 55, delete "said" and insert --side--.

Col. 5, l. 2, delete the second "of".

Col. 5, l. 5, delete "A" and insert --The--.

Col. 5, l. 5, after "further" insert --comprising removing the--.

Col. 6, l. 45, delete "comprising removing the".

Signed and Sealed this

Twenty-ninth Day of August, 1995

Attest:

BRUCE LEHMAN

*Attesting Officer*  *Commissioner of Patents and Trademarks*